United States Patent
Li et al.

(10) Patent No.: US 7,348,102 B2
(45) Date of Patent: *Mar. 25, 2008

(54) CORROSION PROTECTION USING CARBON COATED ELECTRON COLLECTOR FOR LITHIUM-ION BATTERY WITH MOLTEN SALT ELECTROLYTE

(75) Inventors: Wen Li, Ann Arbor, MI (US); Junzo Ukai, Novi, MI (US); Hiroaki Awano, Shizuoka (JP); Yutaka Oyama, Aichi (JP); Masaki Matsui, Shizuoka (JP); Gerald Perron, Boucherville (CA); Michael B. Armand, Saint Martin d'Uriage (FR)

(73) Assignees: Toyota Motor Corporation, Aichi (JP); Toyota Motor Engineering & Manufacturing North America, Inc., Ann Arbor, MI (US); Centre National de la Recherche, Paris (FR); University de Montreal, Quebec (CA)

( * ) Notice: Subject to any disclaimer, the term of this patent is extended or adjusted under 35 U.S.C. 154(b) by 34 days.

This patent is subject to a terminal disclaimer.

(21) Appl. No.: 11/080,592

(22) Filed: Mar. 15, 2005

(65) Prior Publication Data

US 2006/0063072 A1    Mar. 23, 2006

Related U.S. Application Data

(60) Provisional application No. 60/553,443, filed on Mar. 16, 2004.

(51) Int. Cl.
*H01M 2/00* (2006.01)
(52) U.S. Cl. .................. 429/233; 429/231.95
(58) Field of Classification Search ............. 429/218.1, 429/231.95, 231.8, 129, 136, 142, 144, 223, 429/226, 231.4, 231.5, 221
See application file for complete search history.

(56) References Cited

U.S. PATENT DOCUMENTS

| | | | |
|---|---|---|---|
| 3,639,100 A | | 2/1972 | Rick ..................... 23/202 V |
| 4,448,611 A | | 5/1984 | Grellet et al. ............. 148/6.11 |
| 4,463,071 A | | 7/1984 | Gifford et al. ............. 429/194 |
| 4,568,620 A | * | 2/1986 | Wright et al. ............. 429/104 |
| 4,965,146 A | * | 10/1990 | McCullough et al. ....... 429/102 |
| 4,992,345 A | * | 2/1991 | Meintjes et al. ........... 429/103 |
| 5,314,765 A | | 5/1994 | Bates ....................... 429/194 |
| 5,518,839 A | | 5/1996 | Olsen ....................... 429/192 |
| 5,552,241 A | | 9/1996 | Mamantov et al. ........ 429/103 |
| 5,589,291 A | | 12/1996 | Carlin et al. ............... 429/103 |
| 5,591,544 A | | 1/1997 | Fauteux et al. ............ 429/209 |
| 5,938,914 A | | 8/1999 | Dawless et al. ............ 205/391 |

(Continued)

*Primary Examiner*—Patrick Joseph Ryan
*Assistant Examiner*—Monique Wills
(74) *Attorney, Agent, or Firm*—Gifford, Krass, Sprinkle, Anderson & Citkowski, P.C.

(57) ABSTRACT

A battery, such as a lithium-ion battery, comprises a first electrode, a second electrode, a molten salt electrolyte, and an electron collector, associated with the first electrode, the electron collector comprising an electrically conducting film. The battery further includes a protection layer separating the electron collector and the first electrode, the protection layer comprising a carbon-containing material. The electron collector may be an electrically conducting material such as aluminum, aluminum alloy, copper, nickel, other metal (such as alloys), conducting polymer, and the like. In one example, the protection layer is a graphite layer. In other examples, the protection layer may be a fullerene film, carbon nanotube film, or other carbon-containing material.

17 Claims, 3 Drawing Sheets

U.S. PATENT DOCUMENTS

| | | |
|---|---|---|
| 6,224,824 B1 | 5/2001 | Zhang et al. .................. 420/94 |
| 6,326,104 B1 | 12/2001 | Caja et al. .................. 429/188 |
| 6,365,301 B1 | 4/2002 | Michot et al. .............. 429/307 |
| 6,402,795 B1 | 6/2002 | Chu et al. .................. 29/623.5 |
| 6,413,284 B1 | 7/2002 | Chu et al. .................. 29/623.1 |
| 6,495,287 B1 | 12/2002 | Kolb et al. .................. 429/215 |
| 6,544,691 B1 | 4/2003 | Guidotti ..................... 429/344 |
| 6,797,428 B1 | 9/2004 | Skotheim et al. ........... 429/126 |
| 2003/0013003 A1* | 1/2003 | Hinokuma et al. ........... 429/40 |
| 2004/0241532 A1* | 12/2004 | Kim ............................ 429/44 |

* cited by examiner

CORROSION PROTECTION USING CARBON COATED ELECTRON COLLECTOR FOR LITHIUM-ION BATTERY WITH MOLTEN SALT ELECTROLYTE

REFERENCE TO RELATED APPLICATION

This application claims priority to U.S. Provisional Patent Application Ser. No. 60/553,443, filed Mar. 16, 2004, the entire content of which are incorporated herein by reference.

FIELD OF THE INVENTION

The present invention relates to batteries, in particular to electron collectors for batteries.

BACKGROUND OF THE INVENTION

Molten salt electrolytes are considered safer than traditional organic electrolytes, especially for automobile applications. However, corrosion of the electron collector severely affects the performance of batteries having a molten salt electrolyte, degrading cycling ability and high rate performance. Corrosion results from the oxidation of the molten salt electrolyte on the surface of the metal collector, typically aluminum (Al) or iron (Fe), during charge or discharge. The corrosion can significantly reduce the lifetime of the battery.

Hence, if corrosion of the electron collector can be reduced, the use of safer lithium ion (Li-ion) batteries becomes practical, for example, for automobile applications.

There have been some previous studies of reducing the corrosion of metals by molten salts. However, none of them are related to carbon coated electron collectors with a Li-ion battery with molten salt electrolyte.

Patents referenced in this specification are incorporated herein by reference.

SUMMARY OF THE INVENTION

A battery, such as a lithium-ion battery, comprises a first electrode, a second electrode, a molten salt electrolyte, and an electron collector, associated with the first electrode, the electron collector comprising an electrically conducting film. The battery further includes a protection layer separating the electron collector and the first electrode, the protection layer comprising a carbon-containing material. The electron collector may be an electrically conducting material such as aluminum, aluminum alloy, copper, nickel, other metal (such as alloys), conducting polymer, and the like. In one example, the protection layer is a graphite layer. In other examples, the protection layer may be a fullerene film, carbon nanotube film, or other carbon-containing material, such as an electrically-conducting polymer.

DETAILED DESCRIPTION OF THE INVENTION

Carbon-coated electron collectors are described which reduce the problem of corrosion of the electron collector by molten salt electrolytes within a lithium ion battery. Electron collectors may include aluminum, iron, or other electrically conducting material. Approaches to forming the protection layer include physical coating of the electron collector or chemical coating.

Figure 1:
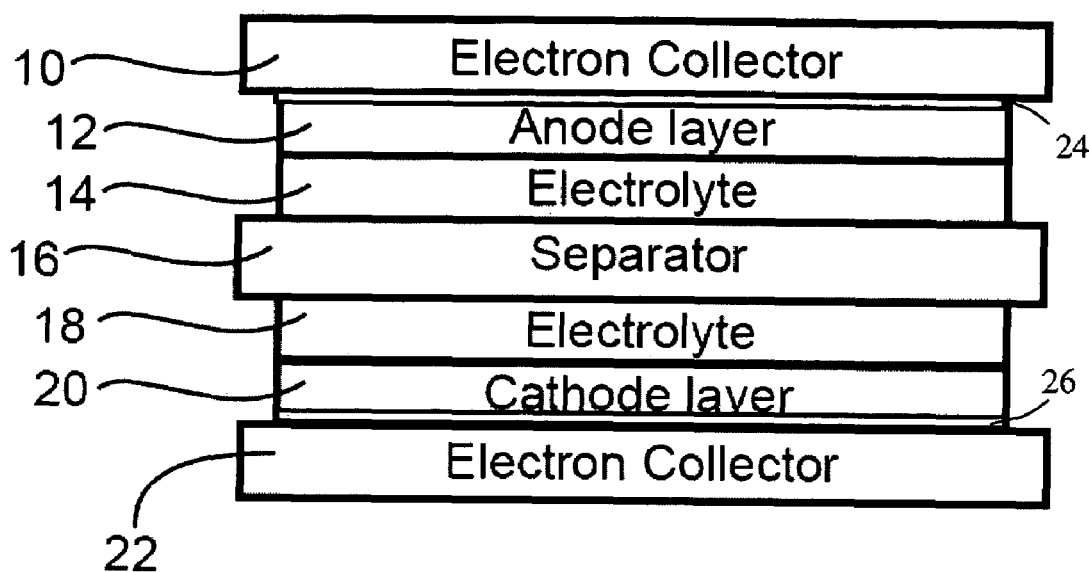
FIG. 1 shows a battery configuration having protection layers on the electron collectors.

FIG. 1 shows a Li-ion battery structure, showing electron collectors 10 and 22, negative electrode layer (anode layer) 12, electrolyte at 14 and 18, separator 16, and positive electrode 20. The positive electrode includes a cathode electroactive material, electron conductive material, and binder material, and the negative electrode includes anode electroactive material, electron conductive material, and binder material. The electron collectors are each covered by a protection layer, shown at 24 and 26.

If the electrolyte is a molten salt electrolyte, and the electron collectors each comprise an aluminum foil (often the case in a conventional Li-ion battery), the electrolyte decomposes on the aluminum foil.

An improved battery includes an electron collector having a protection layer on the surface of the electron collector. In one example, the electron collector is an aluminum foil, and the protection layer comprises carbon in the form of graphite or other elemental form.

In one approach, a protective coating is provided to the electron collector, for example, by a physical coating method. The protection layer can be electron conductive, and may include an electrically conductive polymer or a carbon-containing material such as graphite.

Figure 2:
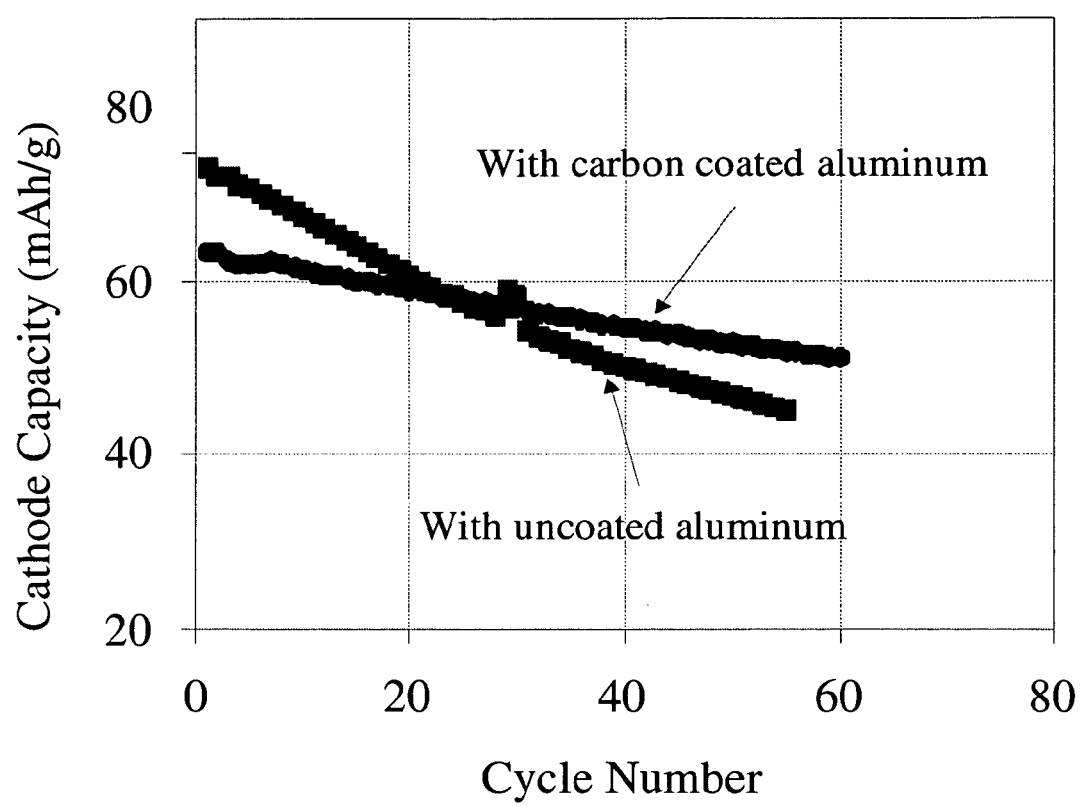
FIG. 2 shows improved results for a carbon-coated electron collector.

FIG. 2 shows the improvement to the cycle life of such Li-ion battery with carbon coated aluminum electron collector, compared with uncoated electron collector, with methyl-propyl-imidazolium-bis-fluoro-sulfonylamide (MPI-FSI) as the molten salt electrolyte. The experimental data suggested that the carbon coated aluminum electron collector could improve cycle life, although the cathode capacity at initial several cycles are not as high as the battery cells with uncoated aluminum electron collector.

Figure 3:
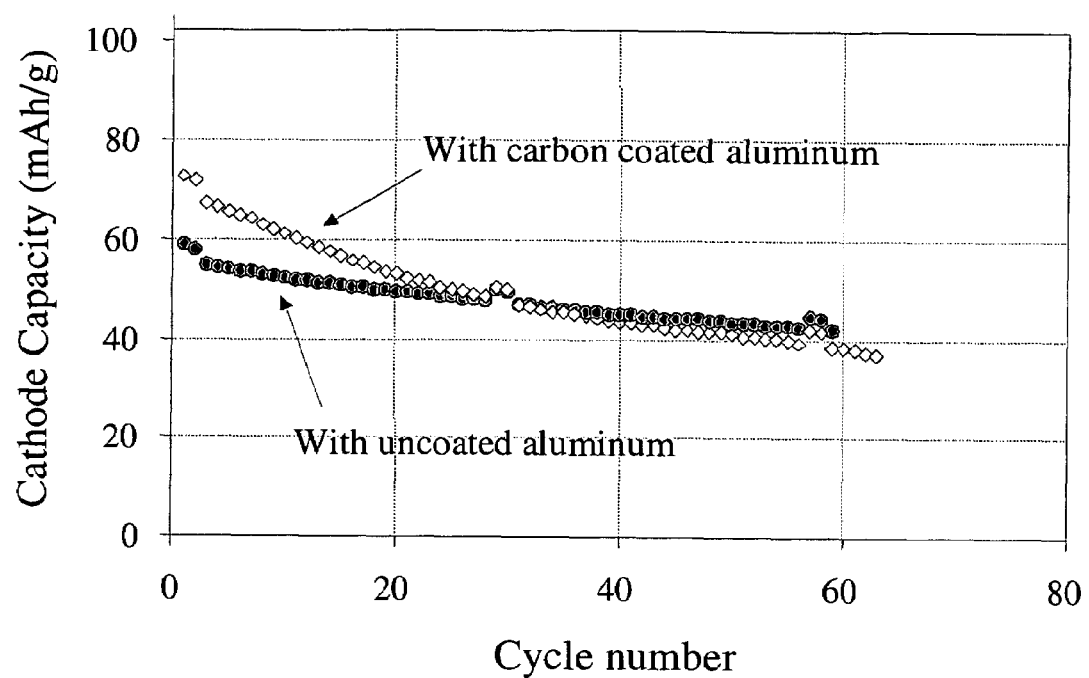
FIG. 3 also shows improved results for a carbon-coated electron collector.

FIG. 3 shows the improvement to the initial capacity of such Li-ion battery with carbon coated aluminum electron collector, compared with an uncoated electron collector, with ethyl-1-methyl-3-imidazolium-bis-fluoro-sulfonylamide (EMI-FSI) as the molten salt electrolyte. The experimental data shows that coated aluminum electron collector improve battery cell's initial cathode capacity while kept same cycle life with the battery cell with uncoated aluminum electron collector.

The difference between the above two experiments is caused by the different corrosion properties of the molten salt electrolytes.

EXAMPLE 1

Positive electrode was fabricated by intimately mixing 85 wt % $LiCoO_2$ powder, 10 wt % carbon powder, and 5 wt % solvent of polyvinylidene fluoride in N-methylpyrrolidone. To form the positive electrode film, the mixed slurry was cast onto aluminum foil (coated or uncoated with carbon) by using doctor blade and dried at 80° C. for 30 minutes.

A negative electrode was fabricated by intimately mixing 85 wt % $Li_4Ti_5O_{12}$ powder, 10 wt % carbon powder, and 5 wt % solvent of polyvinylidene fluoride in N-methylpyrrolidone. To form negative electrode film, the mixed slurry was cast onto aluminum foil (coated or uncoated with carbon) by using doctor blade and dried at 80° C. for 30 minutes.

The positive electrode sheet, a micro-porous polypropylene film separator, and the negative electrode sheet were stacked, and placed in aluminum laminate pack. A certain amount of the MPI-FSI molten salt electrolyte was added in to the laminate pack. Here, methyl-propyl-imidazolium-bis-fluoro-sulfonylamide (MPI-FSI) with lithium-bis-trifluoromethan-sulfonylamide (LiTFSI) was used as the molten salt electrolyte. The aluminum laminate pack was sealed in vacuum to give a soft package battery.

EXAMPLE 2

Positive electrode was fabricated by intimately mixing 85 wt % $LiCoO_2$ powder, 10 wt % carbon powder, and 5 wt % solvent of polyvinylidene fluoride in N-methylpyrrolidone. To form the positive electrode film, the mixed slurry was cast onto aluminum foil (coated or uncoated with carbon) by using doctor blade and dried at 80° C. for 30 minutes.

A negative electrode was fabricated by intimately mixing 85 wt % $Li_4Ti_5O_{12}$ powder, 10 wt % carbon powder, and 5 wt % solvent of polyvinylidene fluoride in N-methylpyrrolidone. To form negative electrode film, the mixed slurry was cast onto aluminum foil (coated or uncoated with carbon) by using doctor blade and dried at 80° C. for 30 minutes.

The positive electrode sheet, a micro-porous polypropylene film separator, and the negative electrode sheet were stacked, and placed in aluminum laminate pack. A certain amount of molten salt electrolyte was added in to the laminate pack. Here, ethyl-1-methyl-3-imidazolium-bis-fluoro-sulfonylamide (EMI-FSI) with lithium-bis-trifluoromethan-sulfonylamide (LiTFSI) was used as the molten salt electrolyte. The aluminum laminate pack was sealed in vacuum to give a soft package battery.

A battery according to the present invention includes a molten salt electrolyte, electrodes (cathode and anode), and electron collectors, the electron collectors having a surface treatment of carbon to reduce corrosion of the electron collector by the molten salt electrolyte.

The surface treatment to the electron collector may include chemical and/or physical deposition processes, chemical bath, anodization technique, or other process or combination of processes.

Electron collectors can include aluminum, copper, iron, steel (such as stainless steel), nickel, zinc, conducting polymers, metalized polymers (such as metalized Mylar), and the like.

In representative examples of the present invention, the protection layer includes a carbon-based material, such as graphite, fullerene, other carbonaceous material, and the like. The protection layer may include a carbon-based material such as graphite, fullerenes, carbon nanotubes, carbon black (and other blacks, such as acetylene black and the like), diamond-like carbon, other carbonaceous material, and the like.

Carbon blacks include acetylene black, channel black, Ketjen black, furnace black, lamp black, thermal black, and others, and are typically formed by incomplete combustion of hydrocarbon vapor. Average particle diameter in a carbon black, or other particulate protection layer, may be in the range 5 nm-1 micron. Levels of chemical impurities, such as oxygen, hydrogen, nitrogen and sulfur, and hydrocarbons such as aromatic compounds, can be removed before use.

The molten salt electrolyte can include one or more of the following: an onium, such as an ammonium, a phosphonium, an oxonium, a sulfonium, an amidinium, an imidazolium, a pyrazolium, and a low basicity anion, such as $PF_6^-$, $BF_4^-$, $CF_3SO_3^-$, $(CF_3SO_2)N^-$, $(FSO_2)_2N^-$. The molten salt electrolyte in the invention may also include $Y^+N$—($—SO_2Rf_2$)($—XRf_3$), where $Y^+$ is a cation selected from the group consisting of an imidazolium ion, an ammonium ion, a sulfonium ion, a pyridinium, a(n) (iso)thiazolyl ion, and a(n) (iso) oxazolium ion, which may be optionally substituted with $C_{1-10}$ alkyl or $C_{1-10}$ alkyl having ether linkage, provided that said cation has at least one substituent of —$CH_2Rf_1$ or —$OCH_2Rf_1$ (where Rf is $C_{1-10}$ polyfluoroalkyl); $Rf_2$ and $Rf_3$ are independently $C_{1-10}$ perfluorophenyl or may together from $C_{1-10}$ perfluoroalkylene; and X is —$SO_2$— or —$CO$—. In a lithium-ion battery, the molten salt electrolyte will also typically include a lithium salt, such as one or more of the following: $LiPF_6$, $LiAsF_6$, $LiSbF_6$, $LiBF_4$, $LiClO_4$, $LiCF_3SO_3$, $Li(CF_3SO_2)_2N$, $Li(C_2F_5SO_2)_2N$, $LiC_4F_9SO_3$, $Li(CF_3SO_2)_3C$, $LiBPh_4$, LiBOB, and $Li(CF_3SO_2)(CF_3CO)N$.

The protection layer may be formed by coating the electron collector with a precursor film, which may comprise organic molecules, polymer, or other carbon-containing material, and using a thermal method (heat treatment) or other treatment to convert the precursor film into the protection layer.

In other examples, the protection layer may be deposited on the electron collector by an electrical discharge in a medium containing a carbon-containing material, or using a carbon-containing electrode as the source of the discharge.

In other examples, a slurry or paste of carbon-containing material in a solvent can be coated on the electron collector, and heated to drive off the solvent.

Any native oxide layer, or other corrosion or undesired surface contaminant, can be removed from the electron collector before coating with the protection layer.

Any suitable deposition process can be used to form the protection layer. For example, a protection layer can be formed by electrostatic deposition of particles, such as carbon-containing nanoparticles.

In other examples, the surface area of the electron collector can be increased, for example by roughening or other surface texturing, before applying the protection layer.

Protection layers, as described herein, disposed on electron collectors reduce the problem of corrosion of the electron collector by molten salt electrolytes within a lithium ion battery. Electron collectors may include aluminum, iron, another metal, or other electrically conducting material. Approaches include physical coating of the electron collector by electron conducting materials, chemical coating (for example, decreasing the aluminum surface potential by oxidation additives), and/or providing promoted aluminum with an aluminum alloy thin film.

In one approach, a protective coating is provided to the electron collector, for example, by a physical coating method. The protection layer can transmit electrons, and may include an electrically conductive polymer or, a carbon material such as graphite. The protection layer may optionally transmit ions, such as lithium ions.

A protection layer applied to an electron collector may include a lithium compound (such as a lithium salt), lithium alloy (such as LiAl alloys), a carbon-based material (such as graphite, fullerene, other carbonaceous material, and the like), oxide (for example, a metal oxide such as a transition metal oxide, lithium oxide, or mixed oxide), hydroxide, other transition metal compound (such as a transition metal chalcegonide), a compound which forms intercalation compounds with lithium ions (such as titanium disulfide), other sulfide, a layer of solid electrolyte, glassy material, crystalline material, amorphous material, elastomer, sol-gel, and the like. A protection layer may include a polymer, such as a polyalklyene oxide (such as polyethylene oxide), conducting polymer (such as a polypyrrole, polyaniline, polythiophene, polyvinylidene fluoride, derivatives thereof, or other electrically conducting polymer), polycarbonate, PVDF, polymer complex (e.g. with a lithium compound), and the like.

U.S. Pat. No. 6,402,795 to Chu et al. discloses lithium ion transmitting materials, such as lithium phosphorus oxynitride, which may be used in embodiments of the present invention. U.S. Pat. No. 6,224,824 to Zhang et al. describes an alloy steel having superior corrosion resistance to molten salts containing alkali oxides. Such steels may be used to protect electron collectors within batteries according to the present invention. U.S. Pat. No. 5,938,914 to Dawless et al. describes a molten salt bath circulation design for an electrolytic cell, and materials and approaches described therein may be used in embodiments of the present invention. U.S. Pat. No. 4,448,611 to Grellet et al. describes a process for improving the corrosion resistance of ferrous metal parts, which may be adapted so as to provide improved steel or iron electron collectors. U.S. Pat. No. 5,591,544 to Fauteux et al. describes methods of reducing the interfacial impedance of an aluminum electron collector, including coating with a primer material. Such materials may be used in place of, or in addition to, other techniques to reduce electron collector corrosion. U.S. Pat. No. 5,518,839 to Olsen describes nickel-coated aluminum electron collectors in solid-state electrochemical cells. Nickel plated, or other metal or alloy plated electron collectors, may be used in a Li-ion battery having a molten salt electrolyte.

In another approach, one or more oxidation additives are disposed on the surface of the electron collector, decreasing the surface potential of the electron collector, and reducing its corrosion by the molten salt electrolyte. For example, using an aluminum electron collector, an $Al_2O_3$ or NiO thin film could reduce the Al oxidation potential.

In a further approach, the electron collector is coated with a thin alloy film, the alloy being resistant to corrosion by the electrolyte. For example, an aluminum electron collector can be coated with an aluminum alloy. The aluminum alloy may be an alloy between aluminum and one or more transition metals.

The electron collector may be also treated using a physical or chemical deposition process, chemical bath, anodization technique, or other process or combination of processes.

Two or more of the above-described approaches may be combined so as to enhance corrosion resistance of the electron collector.

The electron collector may take any physical form, such as a sheet (planar or curved), rod, mesh, porous, granular, two or three-dimensional lattice, or any other form.

The examples above generally relate to a lithium ion battery having a molten salt electrolyte. However, the approaches described can be adapted to work with other battery technologies, as will be clear to those skilled in the battery arts. For example, a protection layer can be provided which transmit other ions, as appropriate to the battery technology, or to function with other forms of electrolyte.

Examples discussed above are applicable to various forms of electron collectors. Electron collectors can include aluminum, copper, iron, steel (such as stainless steel), nickel, zinc, conducting polymers, metalized polymers (such as metalized Mylar), and the like.

Hence, and improved battery includes, a molten salt electrolyte, electrodes, and an electron collector associated with one of the electrodes, the electron collector having a surface treatment operational to reduce corrosion of the electron collector by the molten salt electrolyte. Both electrodes may each have an electron collector so treated.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Patents, patent applications, or publications mentioned in this specification are incorporated herein by reference to the same extent as if each individual document was specifically and individually indicated to be incorporated by reference. In particular, U.S. Prov. Pat. App. Ser. No. 60/553,443 filed Mar. 16, 2004, is incorporated herein in its entirety.

Having described our invention, we claim:

1. A battery comprising
a first electrode;
a second electrode;
a molten salt electrolyte;
an electron collector, associated with the first electrode, the electron collector comprising an electrically conducting film; and
a protection layer separating the electron collector and the first electrode, the protection layer comprising a carbon-containing material,
wherein the battery is a lithium-ion battery.

2. The battery of claim 1, wherein the electron collector is aluminum.

3. The battery of claim 1, wherein the electron collector is an aluminum alloy.

4. The battery of claim 1, wherein the protection layer comprises an electrically conducting carbon film.

5. The battery of claim 1, wherein the protection layer comprises graphite.

6. A battery, comprising
a first electrode;
a second electrode;
a molten salt electrolyte;
an electron collector, associated with the first electrode, the electron collector comprising an electrically conducting film; and
a protection layer separating the electron collector and the first electrode, the protection layer comprising a carbon-containing material, the carbon-containing material being a carbon black.

7. A battery comprising
a first electrode;
a second electrode;
a molten salt electrolyte;
an electron collector, associated with the first electrode, the electron collector comprising an electrically conducting film; and
a protection lever separating the electron collector and the first electrode, the protection layer comprising a carbon-containing material, the carbon-containing material being fullerenes.

8. A battery, comprising
a first electrode;
a second electrode;
a molten salt electrolyte;
an electron collector, associated with the first electrode, the electron collector comprising an electrically conducting film; and a protection layer separating the electron collector and the first electrode, the protection layer comprising a carbon-containing material, the carbon-containing material being carbon nanotubes.

9. A battery, comprising
a first electrode;
a second electrode;
a molten salt electrolyte;
an electron collector, associated with the first electrode, the electron collector comprising an electrically conducting film; and
a protection layer separating the electron collector and the first electrode, the protection layer comprising an electron-conducting polymer.

10. The battery of claim 6, wherein the battery is a lithium-ion battery.

11. The battery of claim 6, wherein the electron collector comprises aluminum.

12. The buttery of claim 7, wherein the battery is a lithium-ion battery.

13. The battery of claim 7, wherein the electron collector comprises aluminum.

14. The battery of claim 8, wherein the battery is a lithium-ion battery.

15. The battery of claim 8, wherein the electron collector comprises aluminum.

16. The buttery of claim 9, wherein the battery is a lithium-ion battery.

17. The buttery of claim 9, wherein the electron collector comprises aluminum.

* * * * *

UNITED STATES PATENT AND TRADEMARK OFFICE
CERTIFICATE OF CORRECTION

| | | |
|---|---|---|
| PATENT NO. | : 7,348,102 B2 | Page 1 of 1 |
| APPLICATION NO. | : 11/080592 | |
| DATED | : March 25, 2008 | |
| INVENTOR(S) | : Wen Li et al. | |

It is certified that error appears in the above-identified patent and that said Letters Patent is hereby corrected as shown below:

Column 6, line 57 replace "lever" with --layer--

Column 8, line 3 replace "buttery" with --battery--

Column 8, line 11 replace "buttery" with --battery--

Column 8, line 13 replace "buttery" with --battery--

Signed and Sealed this

Twenty-fourth Day of June, 2008

JON W. DUDAS
*Director of the United States Patent and Trademark Office*